US008074176B2

(12) United States Patent
Grace

(10) Patent No.: US 8,074,176 B2
(45) Date of Patent: Dec. 6, 2011

(54) ELECTRONIC COMMUNICATIONS DIALOG USING SEQUENCED DIGITAL IMAGES STORED IN AN IMAGE DICTIONARY

(75) Inventor: Mark Grace, Alpharetta, GA (US)

(73) Assignee: Beyondvia Technologies, LLC, Altanta, GA (US)

( * ) Notice: Subject to any disclaimer, the term of this patent is extended or adjusted under 35 U.S.C. 154(b) by 889 days.

(21) Appl. No.: 12/112,842

(22) Filed: Apr. 30, 2008

(65) Prior Publication Data

US 2010/0083141 A1    Apr. 1, 2010

(51) Int. Cl.
*G06F 3/00* (2006.01)
(52) U.S. Cl. ....................................................... 715/752
(58) Field of Classification Search .................. 715/752, 715/758
See application file for complete search history.

(56) References Cited

U.S. PATENT DOCUMENTS

| | | | |
|---|---|---|---|
| 6,505,212 B2 | 1/2003 | Nakano et al. | |
| 6,941,294 B2 | 9/2005 | Flank | |
| 7,082,573 B2 | 7/2006 | Apparao et al. | |
| 7,092,969 B2 | 8/2006 | Meek et al. | |
| 7,177,879 B2 | 2/2007 | Flank et al. | |
| 2002/0120701 A1* | 8/2002 | Ohba | 709/206 |
| 2003/0069801 A1 | 4/2003 | Che-Mponda et al. | |
| 2004/0148573 A1* | 7/2004 | Buice et al. | 715/517 |
| 2005/0027802 A1* | 2/2005 | Madsen et al. | 709/204 |
| 2007/0121146 A1 | 5/2007 | Nesbit et al. | |
| 2007/0174425 A1 | 7/2007 | Gousse et al. | |
| 2007/0195338 A1 | 8/2007 | Brownstein | |
| 2008/0007625 A1 | 1/2008 | Reid et al. | |
| 2008/0060032 A1 | 3/2008 | Toutenhoofd | |
| 2008/0071895 A1 | 3/2008 | Johnson et al. | |
| 2008/0075395 A1 | 3/2008 | Wallace et al. | |
| 2008/0216022 A1* | 9/2008 | Lorch et al. | 715/847 |

* cited by examiner

*Primary Examiner* — Omar Abdul-Ali
(74) *Attorney, Agent, or Firm* — Clements Bernard PLLC; Lawrence A. Baratta, Jr.; Christopher L. Bernard

(57) ABSTRACT

A system and method for an electronic communications dialog between a plurality of users using digital images via a web portal. The user selects a template for entering a plurality of words and associated images that constitute an initial electronic message. The user then enters a plurality of words into the template corresponding to the initial electronic message. A plurality of images are selected having a direct correspondence with the plurality of words entered into the template. Each image is inserted into the template in a sequence corresponding to the initial electronic message. When the initial template is complete, the initial electronic message containing the sequenced images is sent to at least one other user via the web portal. A visual dictionary can be created for each user using a facility which takes images from any electronic source and allows users to apply naming tags to store the images for subsequent retrieval. A visual library can be created for each user to save completed and partially completed templates that can be retrieved for further editing or use.

20 Claims, 10 Drawing Sheets

Visual Talking-Saving to Library

Visual Library Tags: 410
Template Type _____
Name _____
Tag _____
Tag _____
Tag _____

Search terms

421 Public
422 Private

430 Save (& back to home)

450 View Saved

400

Step1
Enter Library Tags

Step2
Decide Public or Private

Step3
Save

FIG. 6

ELECTRONIC COMMUNICATIONS DIALOG USING SEQUENCED DIGITAL IMAGES STORED IN AN IMAGE DICTIONARY

FIELD OF INVENTION

Embodiments of the invention relate generally to electronic communications and, more particularly, to an electronic communications dialog between users via sequences of digital images.

BACKGROUND OF THE INVENTION

The ability for individuals and groups to communicate and carry on a conversation has been dramatically transformed by personal computing/memory devices, easy to use software, and the Internet. For example, consumer communications have evolved over the past twenty years from almost solely using land-based home phone lines for verbal communications and discussions to mobile phone devices which enable both verbal communications and the use of written words as messages in the form of text messages or electronic mail. In this interconnected Internet world, verbal communication is taking a back seat to software that manipulates words enabling text and email messaging. In this new abbreviated-text, quick-phrase Internet world, meaning can be lost, or the electronic message can be easily misinterpreted.

Since the evolution of written communications, natural language words have dominated communication and dialogue, while descriptive pictures have been used to provide ad hoc insertions to words and stories. Even in the current electronic digital age of the Internet, natural language words dominate dialogue, as witnessed by the almost universal use of email and the more recent explosion of text messaging on computers and cell phones.

The continued investment in (1) advanced computer processor and memory technology with the vast manipulation capabilities they provide, and (2) the electronic communication networks that carry the message from one computer, personal digital assistant (PDA), cell phone, or other electronic device to another computer, PDA, cell phone, or other electronic device is the modern day equivalent to investment in the word printing press. More and more efficient natural language word communication is happening at electron speed to instantly connect one user to another user almost anywhere in the world. Yet, the understandable meaning being conveyed may be confused, as words do not always carry enough information for full meaning. For example, when a user texts "Bring home an apple for me," it is not all that clear what type of apple that the user wants: red/green, small/large, juicy/dry, sweet/sour, etc, so the apple that the user gets may not be the one that the user wanted.

SUMMARY OF THE INVENTION

Embodiments of the invention are directed to a system and method wherein natural language words and quick phrases used in electronic communications between parties can be enhanced by direct association with attached clarifying images, thereby creating a sentence composed of images, where the images provide the content details of the communications. The embodiments allow for the selection of a communication template, the insertion of images and descriptive words into the template from a personal or public "visual dictionary," the saving and sending of the finished template over one or more communication networks, linked to a community of users, and the ability of a recipient of the finished template to respond in an iterative and simultaneous dialogue.

Embodiments of the invention use picture communication templates in conjunction with "picture dictionaries" and libraries of past communication to create or respond to a picture message aimed at a specified community or individual. An Internet portal is provided by an independent service provider utilizing at least one server computer. First, viewing access to the portal allows the user to select the appropriate communication template or respond to another template sent to the user. At the same time, the user can passively view the best "picture sentences of the day" as an illustrative training tool. Next, the user populates the selected template with pictures from the user's visual dictionary, or from external picture sources that the user eventually collects and adds to the personal visual dictionary. After the template is completed, the user saves the template to a library, and submits the template for sending to a desired audience via various selectable communication methods. The message is then published to the desired community. The community can respond to the message. If a member of the community is outside of the portal, an alert can be sent to the member to enter the portal and join the conversation or collaboration.

In one embodiment of the invention, a method is provided for an electronic communications dialog between a plurality of users using digital images via a web portal. The user selects a template for entering a plurality of words and associated images that constitute an initial electronic message. The user then enters a plurality of words into the template corresponding to the initial electronic message. A plurality of images are selected having a direct correspondence with the plurality of words entered into the template. Each image is inserted into the template in a sequence corresponding to the initial electronic message. When the initial template is complete, the initial electronic message containing the sequenced images is sent to at least one other user via the web portal.

The system includes a plurality of components that perform the steps of the method when operated on a computer system, such as a server. In an exemplary embodiment, a visual dictionary can be created for each user using a facility which takes images from any electronic source and allows users to apply naming tags to store the images for subsequent retrieval. A visual library can be created for each user to save completed and partially completed templates that can be retrieved for further editing or use.

BRIEF DESCRIPTION OF THE DRAWINGS

These and other advantages and aspects of the present invention will become apparent and more readily appreciated from the following detailed description of the invention taken in conjunction with the accompanying drawings, as follows.

FIG. 6 illustrates an exemplary portal screen for saving the completed template to a library.

DETAILED DESCRIPTION OF THE INVENTION

Figure 1A:
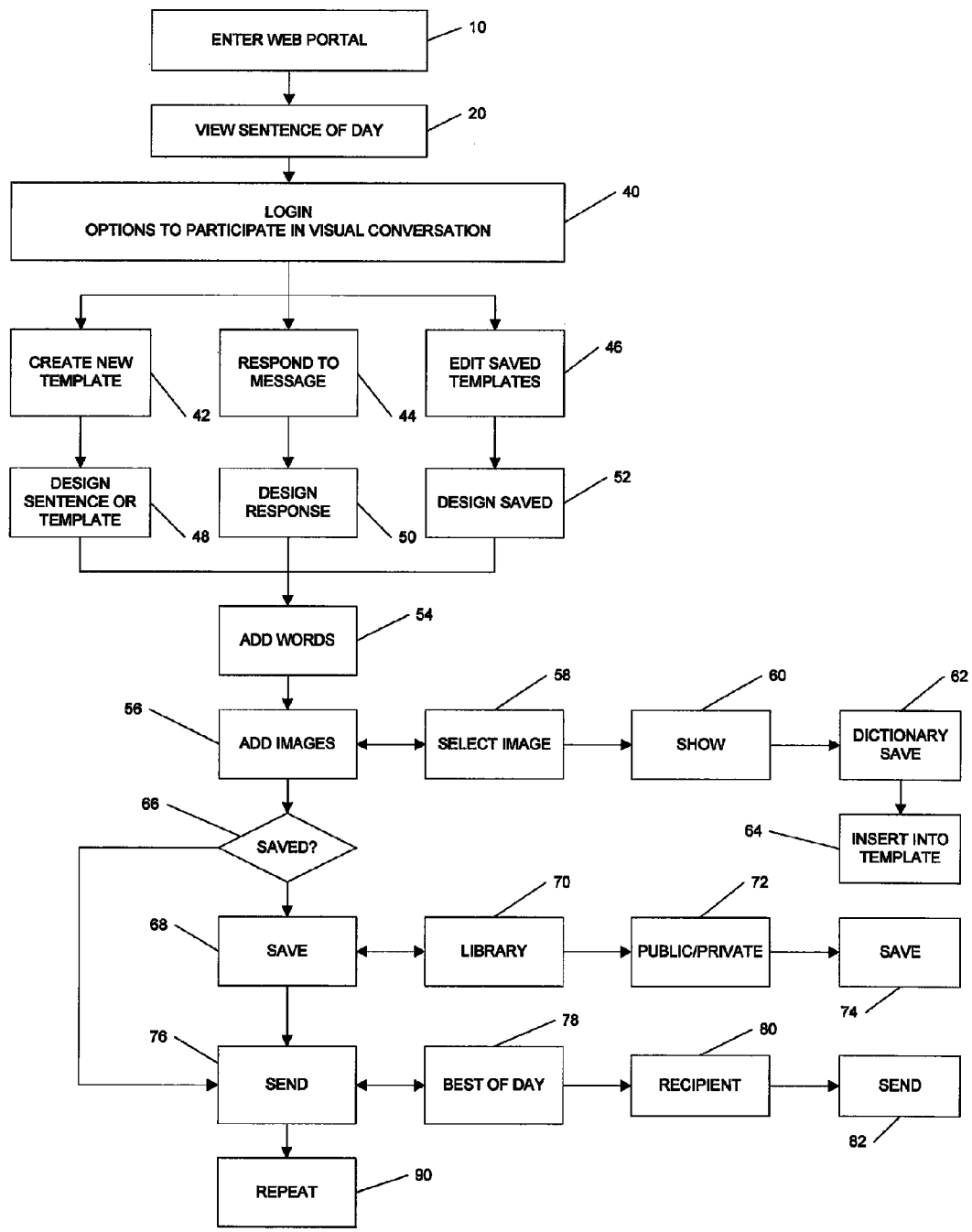
FIG. 1A illustrates an overview of the processing logic to create, save, and send sentences and templates in accordance with an exemplary embodiment of the invention.

The following description of the invention is provided as an enabling teaching of the invention and its best, currently known embodiments. Those skilled in the relevant art will recognize that many changes can be made to the embodiments described, while still obtaining the beneficial results. It will also be apparent that some of the desired benefits of the embodiments described can be obtained by selecting some of the features of the embodiments without utilizing other features. Accordingly, those who work in the art will recognize that many modifications and adaptations to the embodiments described are possible and may even be desirable in certain circumstances, and are a part of the invention. Thus, the following description is provided as illustrative of the principles of the embodiments of the invention and not in limitation thereof, since the scope of the invention is defined by the claims.

Given the rapid increase in memory capacity of computers and networks, current image/picture practice focuses entirely on manipulating images for the passive purpose of image presentation and broadcasting, and has not been used heretofore for structuring a continuing communication dialogue, with connections to a responding community of people or a lasting relevant image and word dictionary. Current software programs having varying levels of ability to name images, search images, manipulate images as for adding to and changing the image, and rank images. Certain Internet web sites allow for the collection of images produced from various sources (e.g., digital cameras) for the purposes of storage and simple display or even printing. As with the printing press, these image storage systems are similar to individual letters in the printing press drawer waiting to be assembled into a template for distribution to the community. And once distributed to the community, the community can respond in kind and carry the discussion forward, saving any components of the discussion they may like, in any form, such as a paragraph, a book, workflow, a manual.

The current natural language word system of dialogue could be enhanced to deliver clearer meaning by a system and method that adds pictures as a fundamental component to the sentence dialogue structure (and other structure templates that can be used to communicate), e.g., inserting the picture of a green, small, granny smith apple enhances the apple text message and better ensures that the user gets the right apple. Therefore, it is desirable to build a communication system and method that uses pictures as the primary mode of dialogue (and words for enhancement).

Embodiments of the invention provide a system and method for electronic communications dialogue between and among a plurality of users. Embodiments include building image dictionaries defined by words, sequencing the images and associated words into certain communication templates, and publishing the templates to select individuals and communities or groups for response and discussion. To initiate a conversation, a user first selects a preferred communication template and inserts sample words, then sample images are selected from a visual dictionary and inserted into the appropriate location in the template until the template is completed. The user selects the method of sending the template, identifies the recipients, and presses send on a user interface.

In an exemplary embodiment, a visual dictionary is created for each user using a facility which takes images from any electronic source (e.g., photos, websites, drawings), makes a simple image, and allows users to apply naming tags to store the image for later retrieval. A visual library is created for each user to save completed and partially completed templates (e.g., visual sentences, paragraphs, etc.) to retrieve them for further editing or use.

The Overall Integrated System

FIG. 1A illustrates an overview of exemplary processing logic to create, save, and send sentences and templates. This exemplary processing logic shows the major activities of sentence/template creation, saving, and sending. Embodiments are directed to a portal system that allows the user to enter the web portal (block 10) and view an example "sentence of the day" (block 20). If the user wants to create his own dialogue, he can log in, and have a number of options to participate in a dialogue (block 40). In a first option, the user could create a new sentence or a new template (block 42). In a second option, the user could respond to a message sent to him from another user (block 44). In a third option, the user could go to his saved templates library (block 46), and select an item to edit. In each case, the user selects a message into which images are added according to the template. To input images, the user either extracts images from sources external to the portal or searches for images in the user's stored visual dictionary. Once an image is selected (block 58), the user can store the image in a "visual dictionary" (block 62) by assigning a word or words to the image, and by assigning a unique random number and other tags that the user defines. Once the user saves the image in a personal visual dictionary (block 62), the user then inserts the image into the template (block 64). The user repeats this image insertion method (blocks 56-64) until the template has been completed, and then moves to save the template in the user's library (blocks 68, 70) or goes directly to send the message (block 76). If the user decides to save the message (block 66), the user defines how to save it in his library (block 70), and can decide to save it as private or public for other users to see (block 72). After saving the message (block 74), the user has the option to send it to someone, or to return to the home portal to insert it into a bigger template, via the send option. Using the send option (block 76), the user can decide to submit the message to the "sentence of the day" (block 78). The user then sends the message to selected individuals and/or groups in the portal (blocks 80, 82), and can send an alert to others outside the portal via electronic means like email. After sending the message (block 76), the user returns to the home portal and can repeat the process (block 90).

The web portal for electronic communications dialog between a plurality of users using digital images can be accessed via any computing device having a networking capability including, but not limited to, mainframe computers, portable computers, workstations, personal digital assistants, cell phones, and other mobile computing devices.

Figure 1B:
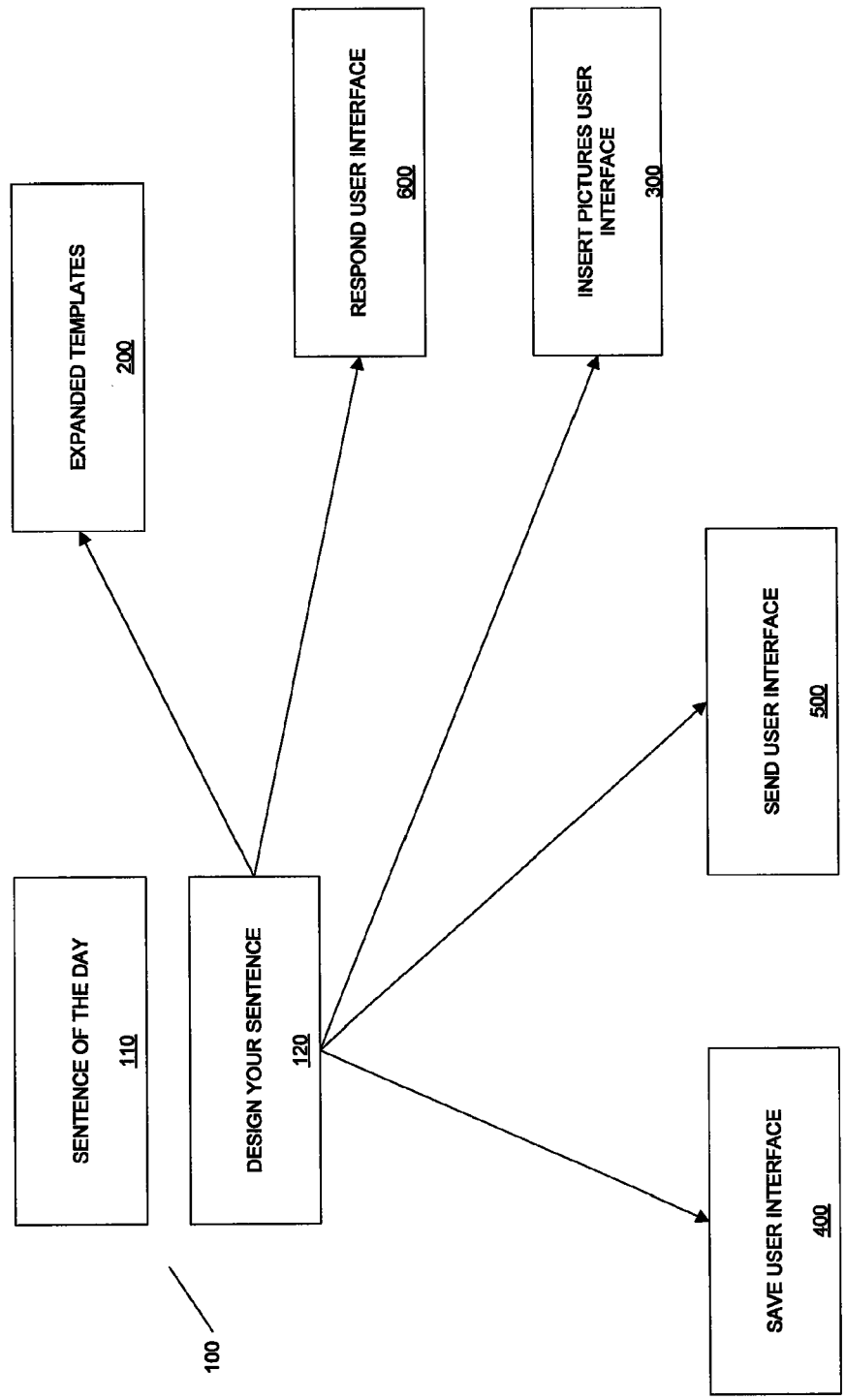
FIG. 1B illustrates an overview of the flow between user interface displays in accordance with an exemplary embodiment of the invention.

FIG. 1B illustrates an overview of the flow between major user interface displays. The various templates including sentences, paragraphs, books, etc. that are used in exemplary embodiments of the invention are described more fully below. User interface 100 enables the new user to view pictoral sentences in section 110 as examples to familiarize the new user with preparing pictoral sentences, or other templates, from scratch, and allows the experienced user ("visual talker") to access any template (200) from section 120, or to respond to recently received dialogue via respond user interface (600). If the user wants to create a new simple sentence of six words or less, the user can use the simple "design your sentence" template (120). To input pictures into the simple "design your sentence" template, the user selects a picture via insert pictures user interface (300) from an external source or from the user's own visual dictionary and then submits the picture to be inserted into the sentence (120). Each picture submitted to template (120) has the option to add descriptive words such that when all the words are combined, they create a simple sentence (or another template). Once the simple sentence is fully completed with pictures and words, the user can save the work via save user interface (400). After saving the work in a visual library using save user interface (400), the user can send the work to be communicated to another user by selecting various sending methods and user types available via send user interface (500).

Similar to a new simple sentence described above, a user can create any pictoral communication using any number of templates available in expanded templates (200). The user can select either to use a respond user interface (600) sending the user to view and highlight messages to respond to, or to view more templates and select which template to use. Once the template is selected, the user inserts pictures via insert pictures user interface (300), saves the completed template via save user interface (400), and sends the template using send user interface (500) similar to the method for a simple sentence.

Accessing the System

Figure 2:
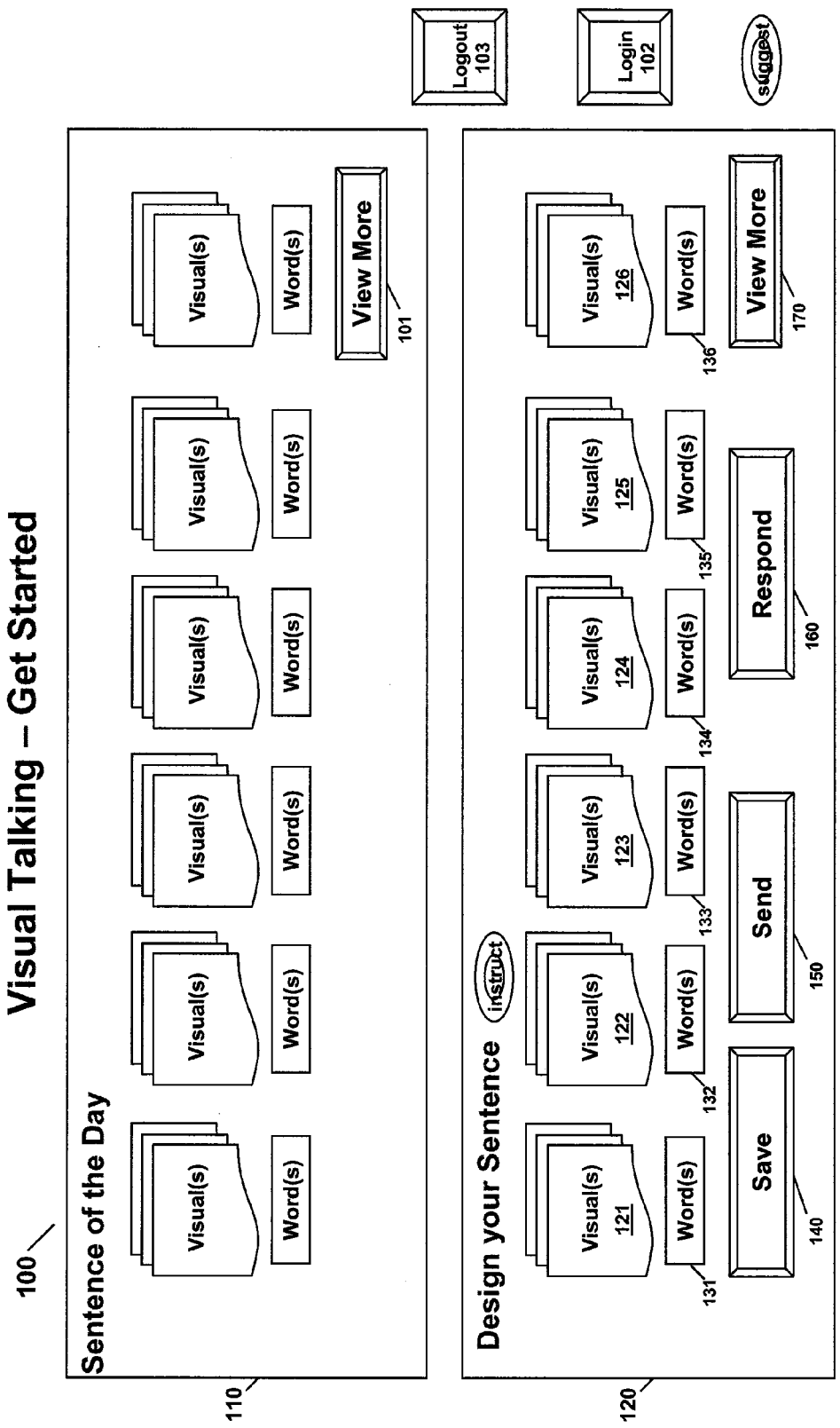
FIG. 2 illustrates an exemplary home portal screen to view a "sentence of the day" and to initiate a user "sentence."

With reference to FIG. 2, the home portal page (100) can be found by the user by typing in the URL of the service provider's website. Once at the home page, the user can view the entire page including sections 110 and 120. Without logging in, the user can view all the examples simply by accessing the list of examples in "View More" (101). To perform any other action, the user must login, by pressing the login button (102). If the user presses any other button (121-126, 140, 150, 160, or 170), the user will be prompted automatically to login. Once login occurs, the user has access to all buttons on the user interface 100.

Selecting a New Template

Figure 3:
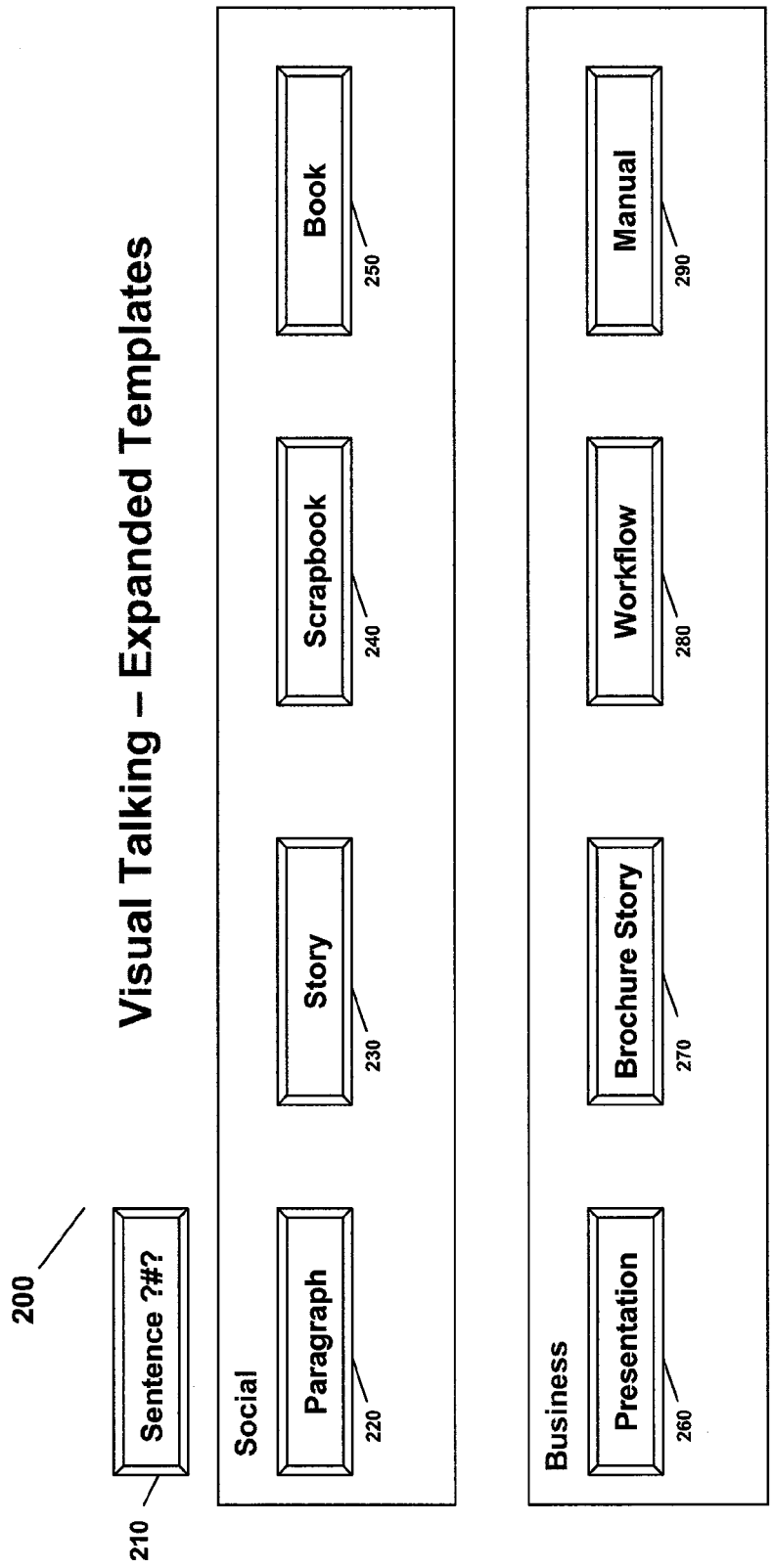
FIG. 3 illustrates an exemplary portal screen for selecting a template.

With reference to FIG. 1, after a user logs in, the user can select only one working template: (1) as a simple sentence (120), (2) as a larger template by pressing "View More" (170), or (3) as a "Respond" (160) using specific response user interface (600). Once the user selects the template, the home page (100) converts to the appropriate user interface, and the user can begin to insert pictures (300) in the appropriate locations. If the user selects "View More" (170), the user will be presented with the user interface illustrated in FIG. 3. With reference to FIG. 3, the user can select a longer sentence (210), a personal (social) template (220, 230,240, 250), or a business template (260, 270, 280, 290).

Inserting Pictures and Words into a Template

Figure 5:
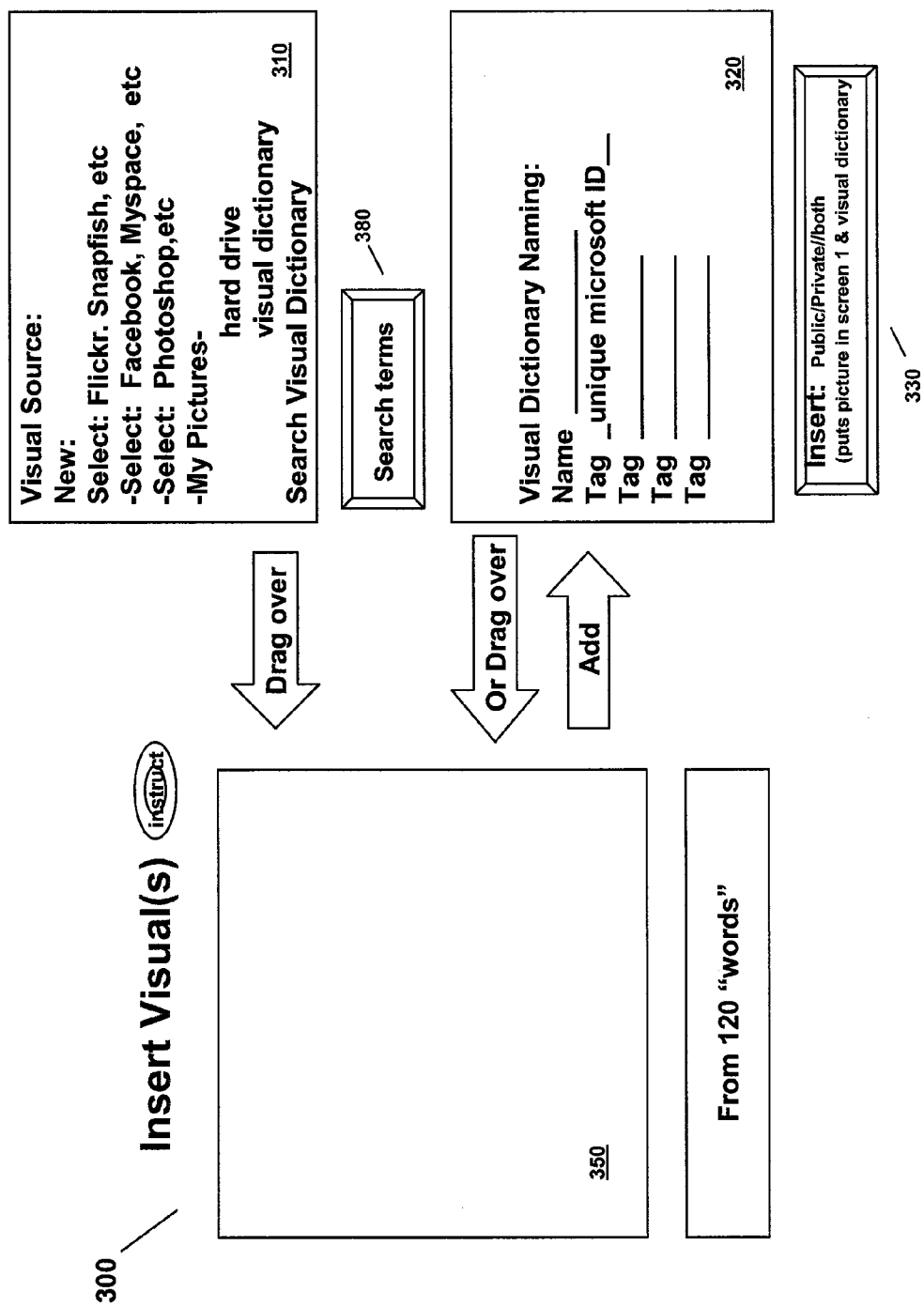
FIG. 5 illustrates an exemplary portal screen for enabling selection and tagging of pictures from a visual dictionary or external source and insertion into the template.

Words are added into a template simply by typing into the word box (131-136). Pictures are added by clicking on the appropriate visual box (121-126, depending on the template chosen) and being transported to the "insert pictures" portal (300) that is illustrated in FIG. 5. Within the insert pictures portal (300), the user can input a new picture into the work area (350) by one of two main methods: by linking (310) to an external site and selecting a picture for insertion, or by "searching terms" (380) in the visual dictionary and selecting a picture for insertion. Once the picture is inserted in the work area (350), the user can enter descriptive data into the appropriate data locations (320). Entering descriptive data into the data locations and saving this for later search creates a personal visual dictionary for the user. As with a word dictionary and a word associated with definitions, this visual dictionary has images and can be searched by a simple word from a word dictionary or can be searched by the other defined data tags (320). Once the user feels he has the right picture and all the data entered to index the picture in a visual dictionary, the user selects the "insert" button (330). This causes the picture to be inserted into the appropriate location in the template (121-126), and simultaneously into the visual dictionary with descriptive data.

Saving the Template

Prior to sending (150) a completed template (120), a user can save the template by pressing the save button (140). The user then enters the save portal user interface (400) as illustrated in FIG. 6. The user inputs data into the appropriate fields creating a visual library record (410). Then, the user must decide to save the record as a public (421) or as a private (422) record. Finally, the user "saves" (430) the completed template in the library and is immediately returned to the home portal (100). At any time while in the save portal, the user may search (450) all previously saved entries in the library, and when completed, return to the save portal with no changes from when the user left the save portal.

Sending the Completed Template

Figure 7:
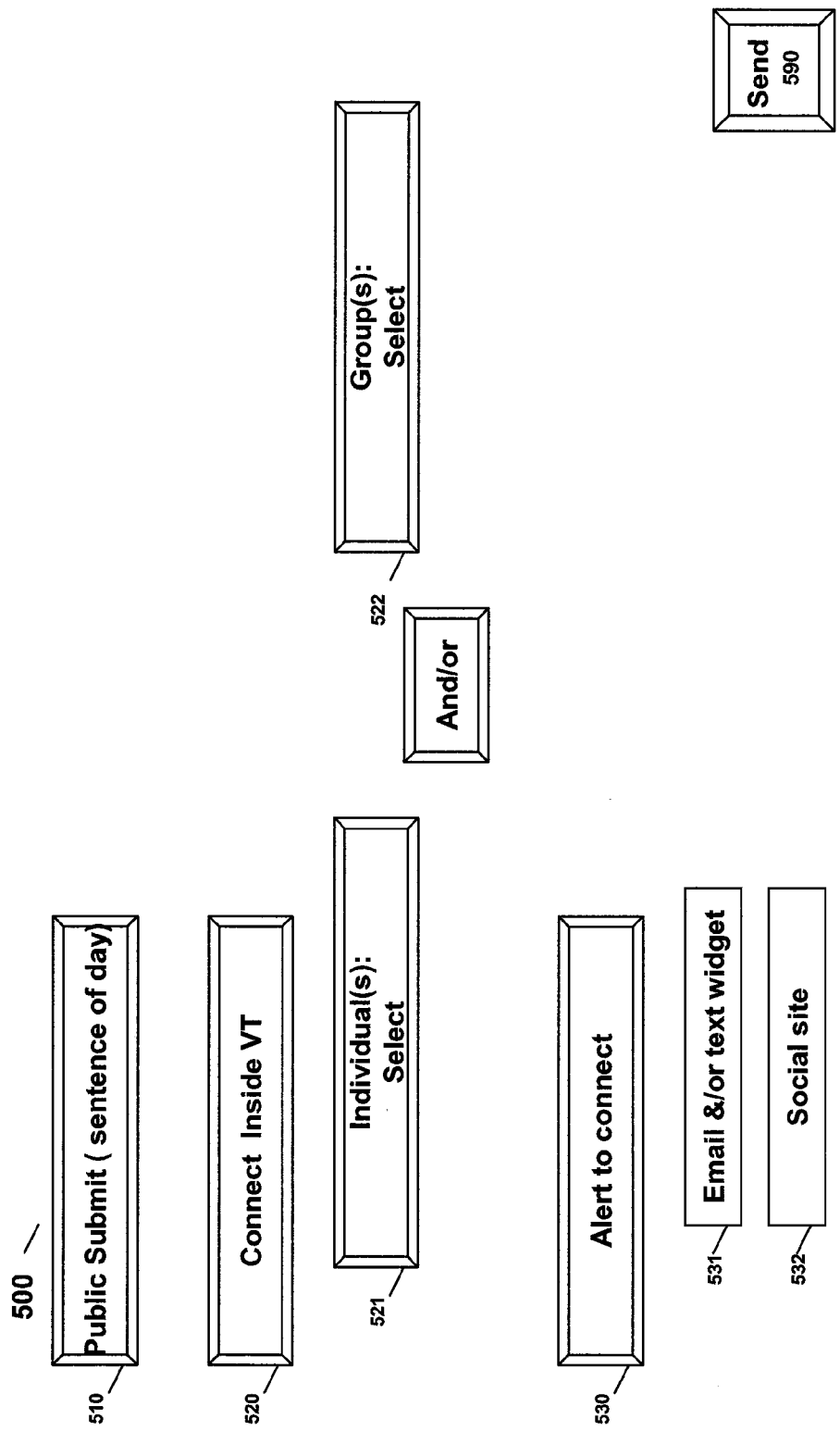
FIG. 7 illustrates an exemplary portal screen for selecting the community and sending the completed template to the community.

With the template complete and saved (140), the user sends (150) the completed template using the send portal (500). FIG. 7 illustrates an exemplary send portal. If the template is a sentence template, the use can select "Public Submit" (510) to be considered for "sentence of the day" and be published on the home portal (100) for viewing by other users. The user must choose who can review the message after login to the portal (520). The user can select individuals (521) or groups (522). If the user wants to send an external alert outside of the portal to the intended recipient (530), the user selects the appropriate alert system (531, 532). After the user selects the send button (590), the user is returned to the original home portal (100) automatically.

Responding to a Message

With reference to FIG. 2, the user knows that there is a message awaiting the user's response by seeing the "Respond" button (160) highlighted. When the user selects the respond button (160), the user is presented with the user interface (600) depicted in FIG. 4. The user can view (610) all messages awaiting response by selecting "View More" (602) and scrolling through a list of templates (i.e., sentences, etc). This scrolling mechanism operates similar to viewing the "sentence of the day" (110) as depicted in FIG. 2, and then scrolling through the sentences after pressing "View More" (101). In the user interface of FIG. 4, in order to select a message to respond to, the user clicks on "Select One" (601), and that selection is then inserted into the "design your sentence" template (620).

The "design/save/send" actions necessary to finish the design of the respond sentence are similar to the actions described above for: (1) inserting pictures and words into a template, (2) saving the template, and (3) sending the completed template. For the first action, the user selects "Visuals" (621-626) in the user interface 600 of FIG. 4, and is presented with user interface 300 of FIG. 5 to insert images. For the second action, the user selects "Save" (640) and is presented with user interface 400 of FIG. 6 to save the template. For the third action, the user selects "Send" (650) and is presented with user interface 500 of FIG. 7 to send the message. The user can press "Home" (670) and return to FIG. 2 at any time.

Edit Library of Saved Templates

Figure 4:
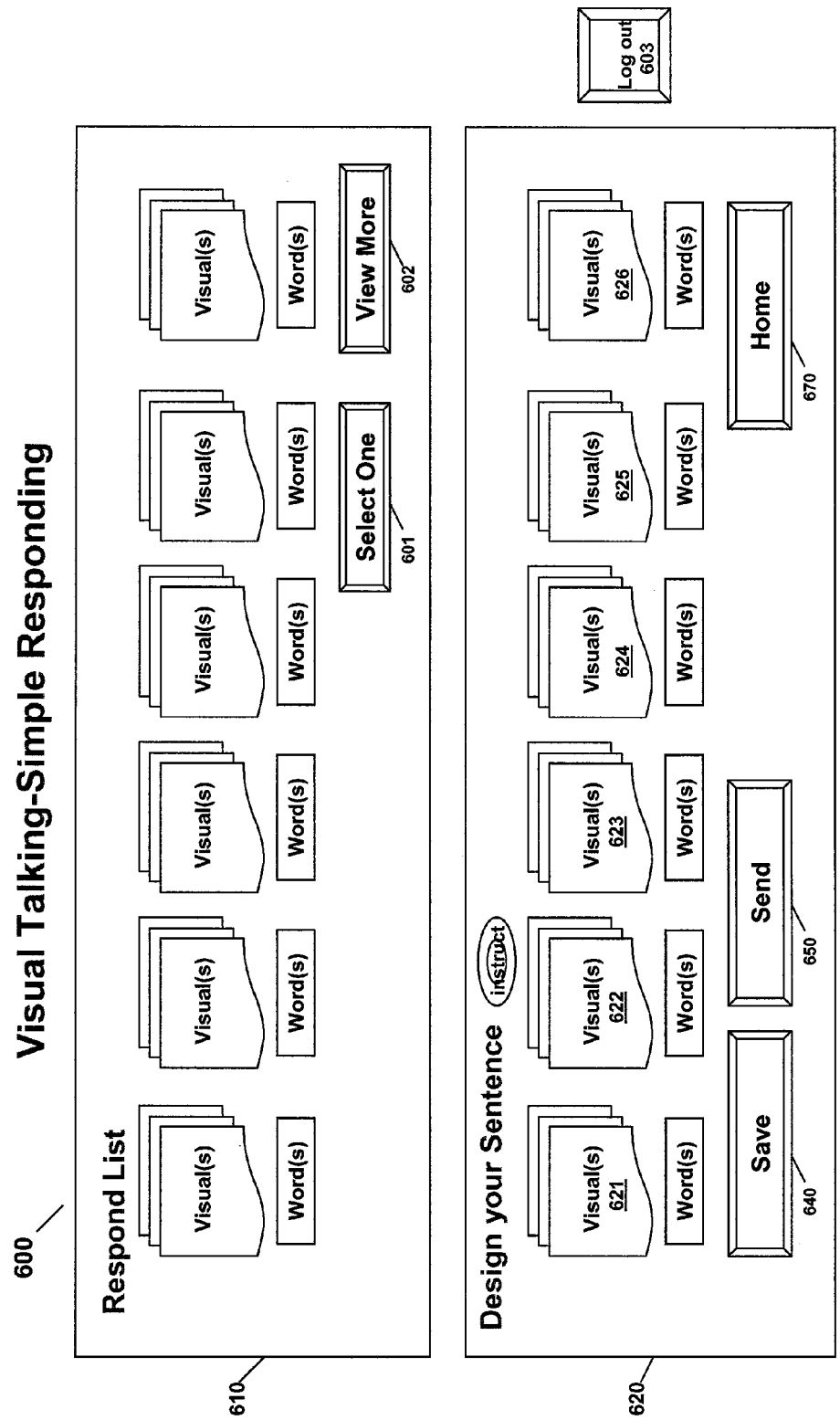
FIG. 4 illustrates an exemplary portal screen for "responding" to messages sent to the login user.
Figure 8:
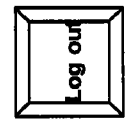
FIG. 8 illustrates an exemplary portal screen for editing the library of saved templates.
Figure 8:
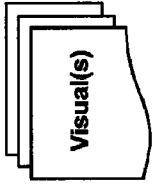
Figure 8:
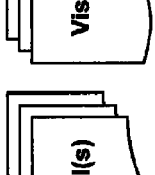
Figure 8:
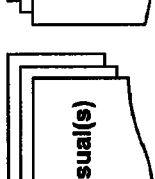
Figure 8:
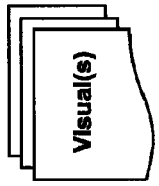
Figure 8:
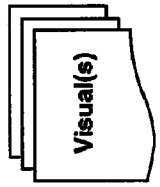
Figure 8:
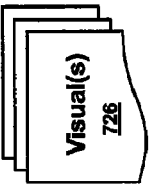
Figure 8:
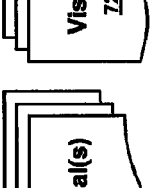
Figure 8:
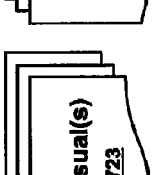
Figure 8:
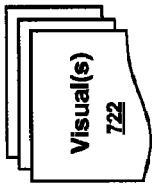
Figure 8:
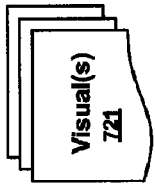

As illustrated in the user interface 700 of FIG. 8, a user may want to: (1) add to and complete a previously saved sentence (720), (2) add/insert a previously saved sentence into a larger template (760), or (3) send a previously completed sentence (750). Similar to responding to a message, as illustrated in FIG. 4, the user selects (701) a saved sentence from a list (702) and edits the saved sentence in "Design your template" (720). Once the user completes the template (720), the user has three options: (1) to save (740), (2) to send (750), or (3) to insert into a larger template (760). Selecting save (740), the user is presented with the user interface of FIG. 6. Selecting send (750), the user is presented with the user interface of FIG. 7. Selecting insert/template (760), the user is presented with the user interface of FIG. 3.

Example

Sentence Message

In creating a simple message "I love you" to send to the user's spouse, the user selects the simple sentence template (120) in the home portal (100) illustrated in FIG. 2. The user types "I" in the first word box (131), "love" in the second word box (132), and "you" in the third word box (133). Above the word "I" the user clicks (121) to go to the "insert pictures" portal (300) of FIG. 5, and selects a picture (310) from an external site where the user stored a self-image digital picture from that day. The user inserts that picture (350) and the associated data and tags (320), and selects the insert button (330) to put the image (121) above the "I" in the template 120. Next, the process is repeated for selecting the image (122) above the word "love," which happens to come from the visual dictionary on a search. The template is completed by adding a picture (123) of the intended recipient ("you") from a digital photo scanned into the "insert pictures" portal (300). With the template completed, the user selects save (140) and in the library (400) user interface of FIG. 6, adds the data (410), private (422), and saves (430). As a final step, the user presses send (150) on the user interface of FIG. 2, selects the individual (521) on the user interface of FIG. 7, and hits send (590). The message is sent to the recipient. The person to whom this message is sent has a respond button (160) flashing and responds to the message using a similar process.

Example

Very Simple Dialogue to Make a Choice while Shopping

As another example, consider a female shopper in the dressing room of a major retailer trying to match a potential new pair of shoes with the best dress from several different dress styles. While in the dressing room, the shopper tries on each dress with the pair of shoes and takes a digital picture of herself on her cell phone and stores each image. After taking all the needed dress pictures, the shopper logs into the portal (100) and enters the design a sentence template (120). The shopper types "Which dress?" into the first word box and then above this word box the shopper clicks (121) to go to the "insert pictures" portal (300). From her saved digital pictures (310), the shopper individually adds each picture taken to the insert visuals (350), and without saving these temporary pictures in the visual dictionary (320), the shopper inserts (330) the pictures into the sentence (121) in one box, and skipping save (140), selects send (150) to send the message to her friend. The person to whom this message is sent responds (160) using a similar process, selects the best dress and sends the response to the shopper. The shopper then leaves the dressing room and buys the selected dress.

Example

Paragraph Message Leading to a Book Template

Figure 9:
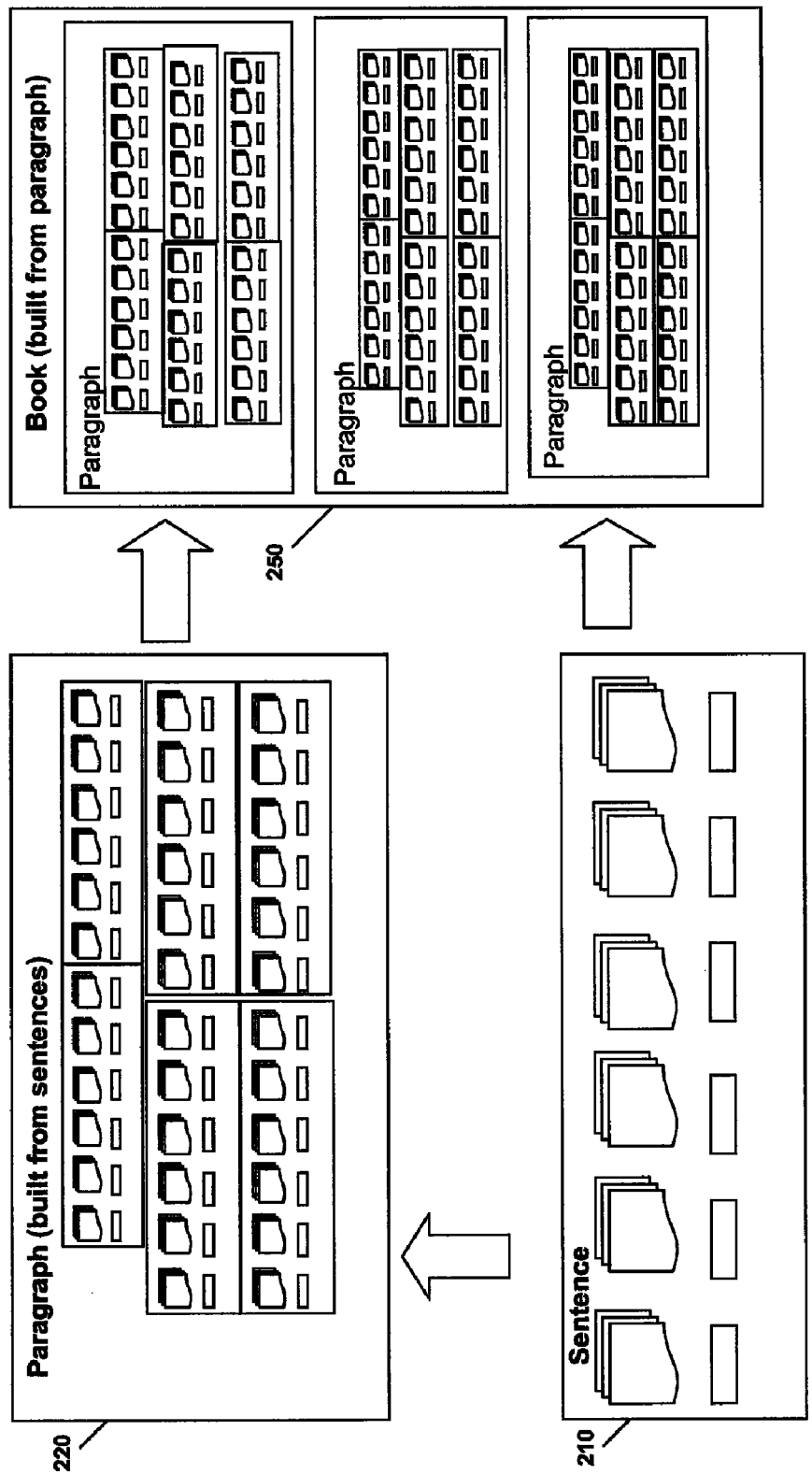
FIG. 9 illustrates an exemplary flow of how to construct a paragraph or book from a plurality of saved sentences.

With reference to FIG. 9, one method to make a paragraph is to create individual sentences (120 or 210), save them individually in the library (410), and add the sentences individually to the paragraph template (220) by using the save library insert template (720) and the select one (701) sentence from viewing the saved sentences (710). For example, consider a user that wants to send the following message to a group of friends: "I went for a walk in the woods. The trees were in full bloom. I saw birds romancing and I heard their songs. I turned over a rock and saw all kinds of critters . . . " During the walk, the user took many digital photos of the woods, the trees, the blooms, birds, critters, etc. For each sentence, the user builds the sentence using the design your sentence template (120) as described in the simple example above, and saves each sentence in the library (410), but does not send the sentences saved. Once all sentences are completed and saved, using the interface of FIG. 8, the user edits the save library (720), selects insert template (760) to select a paragraph (220), clicks "select one" (701) to choose a previously saved sentence, and inserts the sentence into the paragraph template. Once the paragraph is complete the user saves (400) the paragraph and sends the paragraph (500) to a group (522) of friends.

With reference to FIG. 9, the user can create a book, story, or longer template by saving individual paragraphs (220) and then combining the paragraphs together in a book template (250). Combining paragraphs can include editing and manipulation of a plurality of saved sentence templates. The book building process is similar to the paragraph building process described above.

Example

How to Manual at Work

With reference again to FIG. 9, a how to instruction manual at work can be built easily by creating simple sentence (210) instructions and then adding each sentence instruction in a sequenced list to the manual template which is similar to a book template.

Example

Maintenance Worker Asking for Best Way to Fix Trouble at Remote Site

Similar to the shopper example above, consider a maintenance worker who could be at a local site to repair a machine, but needs expert advice from the central office.

Similar to the shopper example, the maintenance worker takes pictures of the machine in action and uses these pictures in sentences sent to the expert, for the expert to select the best way forward. The maintenance worker performs the work recommended by the remote expert and records this success in a workflow (280) template. Furthermore, the maintenance worker can go to the save library (700) and view the pictoral operating manual (290) for the machine.

The corresponding structures, materials, acts, and equivalents of all means plus function elements in any claims below are intended to include any structure, material, or acts for performing the function in combination with other claim elements as specifically claimed. Those skilled in the art will appreciate that many modifications to the exemplary embodiments are possible without departing from the scope of the present invention.

In addition, it is possible to use some of the features of the embodiments described without the corresponding use of other features. Accordingly, the foregoing description of the exemplary embodiments is provided for the purpose of illustrating the principles of the invention, and not in limitation thereof, since the scope of the invention is defined solely by the appended claims.

What is claimed is:

1. A method for an electronic communications dialog between a plurality of users using digital images via a web portal, comprising the steps of:
   selecting a template for entering a plurality of words and associated images that constitute an initial electronic message;
   entering a plurality of words into the template corresponding to the initial electronic message;
   selecting a plurality of images from a visual dictionary associated with a user of the plurality of users, each of the plurality of images having a direct correspondence with the plurality of words entered into the template such that the plurality of images are configured to convey a message represented by the plurality of words to one or more of the plurality of users, and each of the plurality of images is associated with a definition provided by the user such that each of the plurality of images conveys one or more words based on the definition;
   inserting each image into the template in a sequence corresponding to the initial electronic message; and
   sending the initial electronic message containing the sequenced images to at least one other user via the web portal.

2. The method for an electronic communications dialog of claim 1 further comprising receiving the initial electronic message containing the sequenced images in lieu of the plurality of words by the at least one user via the web portal.

3. The method for an electronic communications dialog of claim 2 further comprising responding to the initial electronic message containing the sequenced images by the at least one user via the web portal by generating and sending an electronic response message to a sender of the initial electronic message, wherein the response message includes a plurality of sequenced images from a visual dictionary associated with the at least one user, public images of the sender, or a completed template.

4. The method for an electronic communications dialog of claim 1 further comprising the user saving the one or more images into the visual dictionary, wherein each of the one or more images are associated with a search term comprising the definition provided by the user, wherein the one or more images are marked as private or public with the private images only accessible by the user and the public images accessible by any user.

5. The method for an electronic communications dialog of claim 4 wherein each image saved in the visual dictionary is also associated with at least one user defined naming tag for image retrieval.

6. The method for an electronic communications dialog of claim 1 further comprising saving a completed template into a record in a visual library wherein each saved template can be submitted by a sender for either a public or a private use in a plurality of additional electronic communications dialogs, wherein the completed template comprises a plurality of images, each of which is configured to convey a message associated with the completed template.

7. The method for an electronic communications dialog of claim 6 further comprising manipulating a plurality of saved templates to generate a paragraph represented by the plurality of images corresponding to the manipulated templates, wherein the paragraph is constructed from the plurality of images.

8. The method for an electronic communications dialog of claim 1 further comprising sending an alert message to at least one user that is not logged on to the web portal.

9. The method for an electronic communications dialog of claim 1 further comprising displaying an indication of an electronic message waiting for response to the at least one other user via the web portal, wherein the electronic message contains a plurality of sequenced images.

10. The method for an electronic communications dialog of claim 1 wherein the selected template comprises at least one of a sentence template, a social template, and a business template, the selected template configured to convey messages via pictures in lieu of words.

11. The method for an electronic communications dialog of claim 10 wherein the social template comprises at least one of a paragraph, a story, a scrap book, and a book.

12. The method for an electronic communications dialog of claim 10 wherein the business template comprises at least one of a presentation, a brochure, a workflow, and a manual.

13. The method for an electronic communications dialog of claim 1 further comprising accessing the web portal via at least one of a mainframe computer, a portable computer, a workstation, a personal digital assistant, a cell phone, and a mobile computing device.

14. The method for an electronic communications dialog of claim 1 wherein selecting the plurality of images comprises linking to a website external to the web portal and selecting a plurality of digital images for insertion into the template, wherein each of the plurality of images are associated with a search term comprising the definition provided by the user, and the plurality of images are marked as private or public with the private images only accessible by the user and the public images accessible by any user.

15. The method for an electronic communications dialog of claim 4 wherein selecting the plurality of images comprises searching the visual dictionary using at least one search word and selecting a plurality of digital images for insertion into the template.

16. A system for an electronic communications dialog between a plurality of users using digital images via a web portal, comprising:
   a data storage for storing a plurality of words and corresponding images in a visual dictionary of a user, the data storage configured to save the corresponding images and associate the plurality of words with the corresponding images, wherein the corresponding images are marked as private or public with private images only accessible by the user and public images accessible by any user;
   a processor for executing a plurality of components, including:
      a component that provides a template for the user to enter a plurality of words and associated images that constitute an initial electronic message;
      a component that provides a plurality of images for user selection wherein the plurality of images have a direct correspondence with the plurality of words entered into the template such that the plurality of images are configured to convey a message represented by the plurality of words;

a component that provides for insertion of each image into the template in a sequence corresponding to the initial electronic message; and a component that sends the initial electronic message containing the sequenced images to at least one other user via the web portal.

17. The system for an electronic communications dialog of claim 16 further comprising a component that receives the initial electronic message containing the sequenced images by the at least one user via the web portal.

18. The system for an electronic communications dialog of claim 17 further comprising a component that enables the at least one user to generate and send an electronic response message via the web portal to a sender of the initial electronic message, wherein the response message includes a plurality of sequenced images from a visual dictionary associated with the at least one user and public images of the sender.

19. The system for an electronic communications dialog of claim 16 wherein the visual dictionary comprises a plurality of images and associated naming tags for retrieval of the images.

20. The system for an electronic communications dialog of claim 16 further comprising another data storage for storing a plurality of completed templates submitted by at least one user in a visual library.

* * * * *